Feb. 11, 1958     T. C. PARKER ET AL     2,822,721
SHUTTER ATTACHMENT FOR HIGH SPEED CAMERAS
Filed Feb. 2, 1954     3 Sheets-Sheet 1

INVENTORS
THEODORE C. PARKER
WILLIAM C. GRIFFIN
BY
ATTORNEYS

Feb. 11, 1958    T. C. PARKER ET AL    2,822,721
SHUTTER ATTACHMENT FOR HIGH SPEED CAMERAS
Filed Feb. 2, 1954      3 Sheets-Sheet 2

INVENTORS
THEODORE C. PARKER
WILLIAM C. GRIFFIN
BY
ATTORNEYS

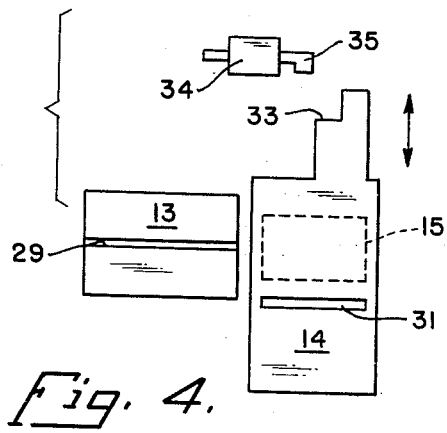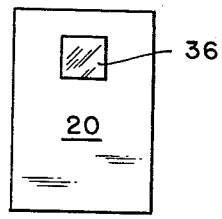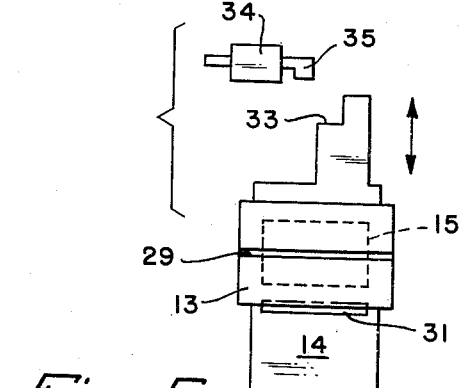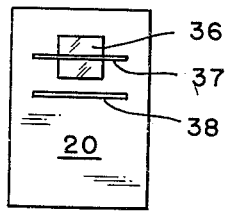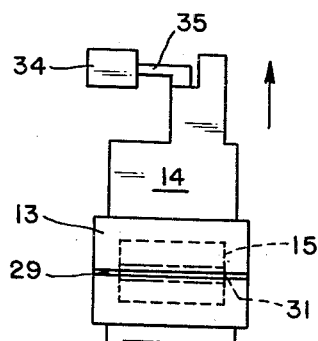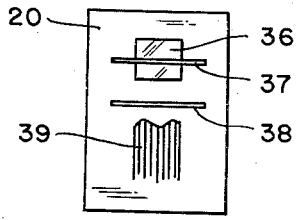

United States Patent Office 2,822,721
Patented Feb. 11, 1958

2,822,721

SHUTTER ATTACHMENT FOR HIGH SPEED CAMERAS

Theodore C. Parker, Pasadena, and William C. Griffin, China Lake, Calif.

Application February 2, 1954, Serial No. 407,822

10 Claims. (Cl. 88—16)

(Granted under Title 35, U. S. Code (1952), sec. 266)

The invention described herein may be manufactured and used by or for the Government of the United States of America for governmental purposes without the payment of any royalties thereon or therefor.

The present invention relates to cameras and more particularly to an improved high speed rotating-mirror camera embodying a novel shutter arrangement. Various prior art cameras have been developed for photographically recording detonation phenomena of explosives, and at least one such prior art camera employed a rotatably mounted mirror for providing both a latent physical image of an object and a latent smear image of the object, hereinafter referred to as physical image and smear image respectively. The arrangement of the above-mentioned prior art camera was such, however, that the smear image and the physical image had to be formed either on separate negatives or on a long film strip and, moreover, no time or position correlation existed between such images. Further, such prior art camera had no provision for the forming of slit images or reference lines on the negatives to provide a time base for evaluation of the detonation phenomena and a position reference line to define the locus of investigation on the subject both of which are required to enable an accurate investigation of the detonation phenomena.

The present invention provides an improved rotating mirror camera including a novel shutter arrangement and cooperating mirror indexing means whereby there may be formed on a single film a physical image, certain slit images or reference lines, and a smear image, which images are correlated in such a manner as to permit more accurate investigations of explosive burning.

In accordance with the foregoing, it is an object of the present invention to provide an improved rotating mirror camera.

Another object of the invention is to provide an improved rotating mirror camera embodying an improved shutter arrangement and cooperating mirror indexing means whereby a latent image of the physical subject, certain latent images or reference lines, and a latent smear image of the subject during the detonation thereof may be formed on a single film.

A further object of the invention is to provide an improved shutter attachment for rotating mirror cameras whereby to provide for the forming on a single film of a latent image of a subject, reference lines, and a latent smear image of the subject, during detonation such images being so correlated as to permit accurate investigation of explosive phenomena.

Still a further object of the invention is to provide an improved rotating mirror camera and shutter arrangement therefore wherein the shutter comprises a slit plate and a shutter plate which are selectively positionable in alignment with the camera entrance window so as to permit the forming on a single film of a latent physical image of the object, certain latent slit images, and a latent smear image.

Still a further object of the invention is to provide an improved method of photographically recording explosive phenomena.

Other objects and many of the attendant advantages of the present invention will become apparent as same becomes better understood from the following detailed description had in conjunction with the annexed drawings, wherein.

Figs. 4 through 6-a illustrate the sequence of shutter operation and the latent images produced thereby.

Figure 1:
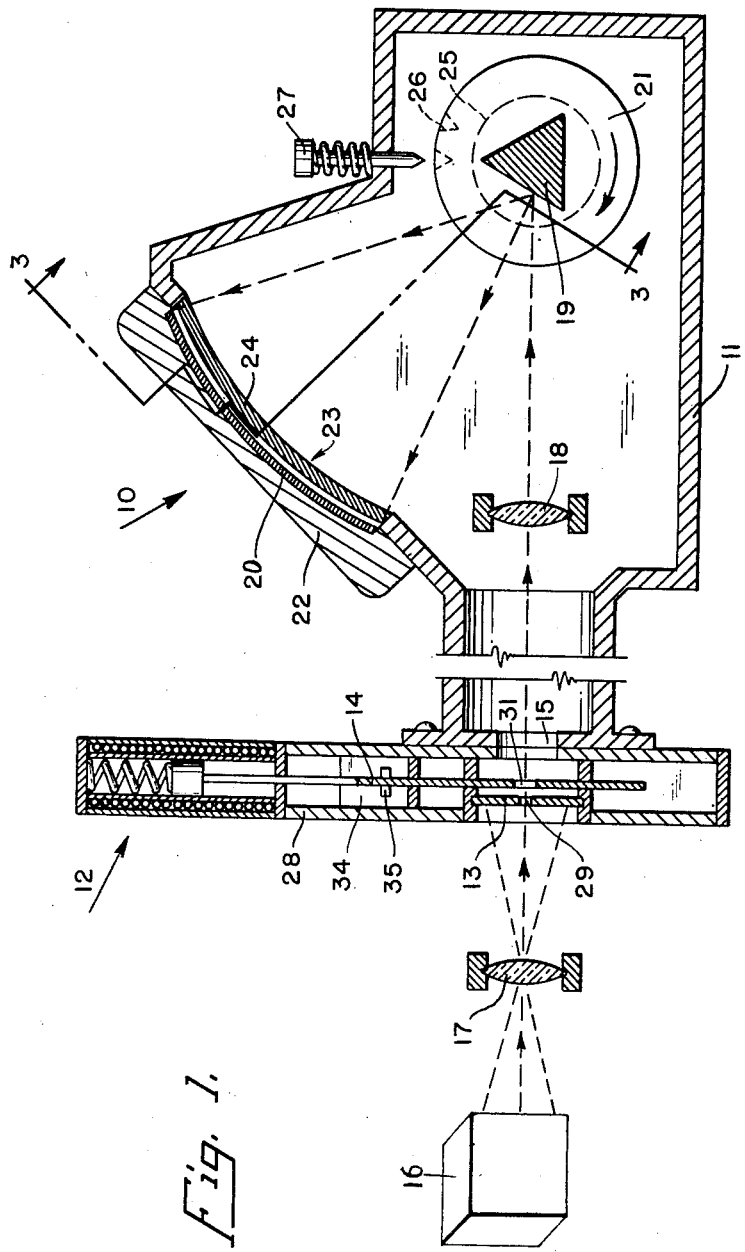
Fig. 1 is a longitudinal sectional view of the camera and shutter arrangement of the present invention shown in position for photographically recording the detonation phenomena of an explosive.

Referring now to the drawings and more particularly to Fig. 1, there is illustrated generally at 10 the camera arrangement of the present invention comprising a housing 11 having attached to one end thereof a shutter attachment 12 embodying a slit plate 13 and a shutter plate 14 which are movable so as to position openings formed therein in alignment with the camera entrance window 15 whereby to permit light from the subject 16, passing through an external lens system 17, to pass through into the interior of housing 11 where it is focused by an internal lens system 18 onto the rotary mirror 19 and thence reflected onto the film 20. The external lens system 17 is manually adjustable whereby an image of the subject 16 may be formed on a slit plate 13 during setting up of the apparatus, the internal lens system 18 serving to project the portion of said image passed by the slit plate 13 and/or shutter plate 14 onto the reflecting surfaces of mirror 19. Mirror 19 may, for example, be triangular in cross-section so as to provide three angularly disposed reflecting surfaces as shown, and may be attached to a supporting member 21. Mirror 19 and its supporting member 21 are mounted in the housing 11 for a rotation about the longitudinal geometric axis of the mirror 19 whereby the portion of the image passed by the slit plate and/or shutter plate may be caused to sweep across the film 20 in the manner diagrammatically illustrated by the dotted lines. Film 20 is mounted in a film holder 22 which overlies an opening 23 formed in the housing 11 and said film holder is removably secured in position by suitable fastening means, not shown. In order that the reflected image from mirror 19 will remain in focus throughout its entire sweep across the width of film 20, the film supporting surface of holder 22 may be made to conform to the surface of a cylinder whose axis passes approximately through the intersection of the optical axis of the lens systems 17 and 18 with the adjacent reflecting surface of mirror 19 as shown. A curved focusing plane may be disposed across the opening 23 as at 24 to permit focusing of the reflected image onto the film 20. Mirror 19 and its supporting member 21 may be driven in rotation by a driving member 25. Supporting member 21 has provided in its periphery a plurality of angularly disposed recesses 26 for selectively receiving a plunger member 27 having a conical end surface whereby the mirror 19 may be manually indexed to given predetermined angular positions for a purpose to be later described.

Figures 2, 3:
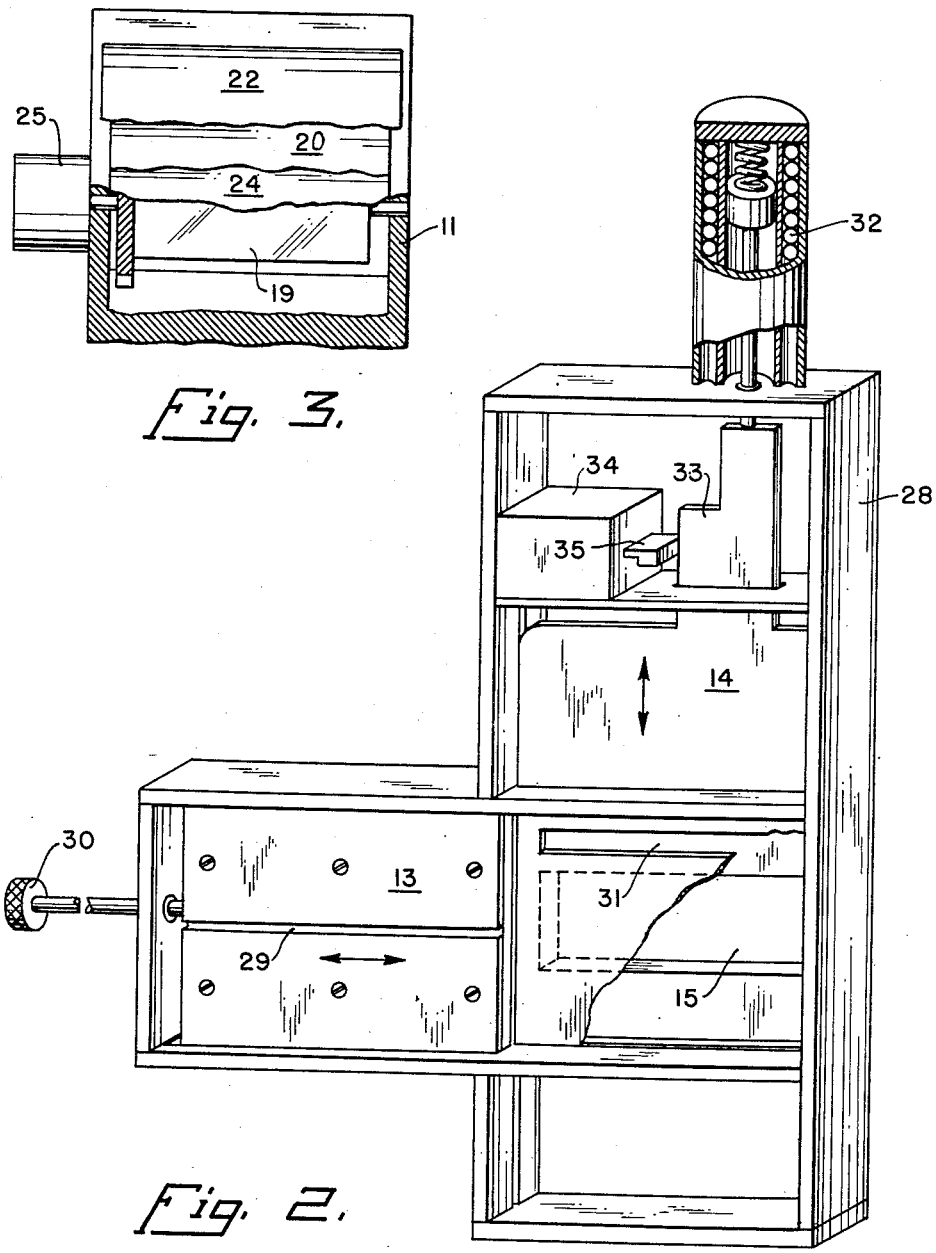
Fig. 2 is a perspective view of the shutter arrangement of the present invention with parts broken away for the sake of clarity.
Fig. 3 is a sectional view taken substantially along line 3—3 of Fig. 1.

Referring now to Fig. 2 wherein the shutter attachment is shown in greater detail, there is provided a frame 28 which supports the slit plate 13 and the shutter plate 14 for movement relatively thereto. Slit plate 13 is opaque except for a narrow transparent slit 29 formed therein and is adapted to be moved in a horizontal plane, as viewed in Figs. 1 and 2, across the camera entrance window 15. The slit plate 13 may be provided with a shaft 30 for positioning it across the camera entrance window 15 and for moving it to its retracted position as shown. Shutter plate 14, which may be shaped as shown, is provided with a shutter window 31 which is adapted to be moved across the camera entrance window 15 upon vertical movement of the shutter plate 14, as seen in Figs. 1 and 2. Shutter 14 is actuated by a solenoid 32 and has provided thereon a shoulder 33 adapted to be selectively engaged with a shutter stop mechanism 34 including an extendable stop member 35 operated by a solenoid contained within the mechanism 34.

The operation of the present invention is as follows. The subject 16 which is to be studied is positioned on the optical axis of the camera, as shown, and the external lens system 17 is adjusted so as to bring the subject image to focus on the slit plate 13 which will then be positioned in its extended position in front of the camera entrance window 15. The slit plate 13 is now moved to its retracted position shown in Fig. 2, and the mirror 19 is index so as to throw the image of the subject 16 onto the curved focusing plane 24 with film holder 22 removed. The internal lens system 18 is manually adjusted to bring the image of subject 16 into focus on the curved focusing plane 24. The film holder 22, with the film 20 disposed therein, is secured in the position shown, and the shutter plate is actuated across the camera entrance window by operation of solenoid 32, with the slit plate in its retracted position shown in Fig. 4, whereby to form on film 20 a latent image of the physical subject as indicated at 36 in Fig. 4a. Next, the slit plate 13 is moved to its extended position across the camera entrance window as shown in Fig. 5, and the shutter plate 14 is again actuated across the camera entrance window to provide a latent slit image or reference line 37 across the latent image 36 of the physical subject as shown in Fig. 5a, whereby to define the locus of investigation on the subject. Mirror 19 and its supporting member 21 are now indexed to such a position that a second latent slit image or reference line may be formed somewhat below the latent image 36 of the physical subject.

The shutter plate 14 is again actuated across the camera entrance window 15 with the slit plate 13 in its extended position as shown in Fig. 5, and the second latent slit image or reference line 38 is formed as shown in Fig. 5a. The latent images 36, 37 and 38, formed on film 20 in each of the above steps, come from the reflected image of said physical subject from external light illuminating the same one physical subject. In each of the above steps, the stop member 35 is retained in its retracted position as shown in Figs. 4 and 5. The driving means 25 is now energized to cause rotation of mirror 19. When the mirror has attained a desired rotational speed stop 35 is actuated to its extended position and solenoid 12 is energized to actuate the shutter plate 14 to a position with its shoulder 33 in contact with stop 35 whereby the shutter window will be aligned with the camera entrance window and with the slit 29 formed in slit plate 13 as shown in Fig. 6. Where the subject to be studied, for example, is an explosive whose detonation phenomena is to be observed, the subject is ignited and the rotation of mirror 19 will cause a latent smear image 39 to be formed on film 20 as shown in Fig. 6-a.

Stop 35 may be used in three ways depending upon the characteristics of the subject to be studied. Thus, where a fast burning powder is to be observed, the shutter stop may be retained in its retracted position and the shutter swept across the slit. Where a medium burning propellant is to be studied, the stop is moved to its extended position as shown in Fig. 6, and the shutter is moved up to the stop and then to its original position. Where a slow burning propellant is to be studied the stop 35 is retained in its extended position as shown in Fig. 6, and the shutter is moved up into contact with the stop, retained there for a desired period of time, and then returned to its original position. Means, not shown, may be provided for automatically actuating the shutter upon the mirror 19 reaching the desired rotational speed and for assuring synchronization between the operation of the shutter and the mirror 19 whereby the shutter will not be actuated until the mirror is so positioned as to cause the smear image to be formed on the appropriate portion of the film as shown in Fig. 6-a.

This completes the cycle of operation of the instant camera. After development of the film, lines may be drawn from the smear image 39 perpendicular to the first slit image 37, whereby to indicate the exact point on the subject where a certain phenomena occurs and, moreover, the time sequence of the various burning phenomena may be studied with reference to the second latent slit image or reference line 38.

Obviously many modifications are possible in light of the above teachings. It is therefore to be understood that within the scope of the appended claims the invention may be practiced otherwise than as specifically described herein.

What is claimed is:

1. In a high-speed camera of the type which has means for holding a strip of film in a fixed position and utilizes a rotating mirror in the optical system thereof, means for releasably positioning said mirror in a given indexed position in which the light from an illuminated object may be reflected to a portion of said strip of film, shutter means to admit light from said illuminated object to said mirror through said optical system with said mirror held in said indexed position to form a latent image of the object on said strip of film, slit means interposable between said object and said optical system whereby upon a second operation of said shutter means with said mirror in the same given indexed position, a still, latent image of a thin strip of the same object in the same position is superimposed upon the first mentioned image on said film, and upon subsequent release of said mirror and operation of said camera as a high-speed camera with said slit still interposed in the optical system, a latent smear image of said thin strip of the same object in the same position is formed upon a different portion of said strip of film, the first and second named images serving as a reference background for comparison with the smear image.

2. In a high speed camera of the type which has means for holding a strip of film in a fixed position and utilizes a rotating mirror in the optical system thereof, means for releasably positioning said mirror selectively in either of two given indexed positions whereby light from an illuminated object may be selectively reflected to different portions of said strip of film, shutter means to admit light from said illuminated object to said mirror through said optical system, and slit means interposable between said object and said optical system whereby a first latent image of the entire object may be formed on said film by positioning said mirror in one of said two mentioned positions and operating said shutter means with the slit means not interposed, a second latent image of a thin portion of the same object in the same position may be superimposed on said first latent image by interposing the slit means and operating the shutter means, with the mirror still held in said position, a third latent image consisting of the same thin portion of the object may be formed on a different portion of said film by indexing said mirror to the second given position and operating said shutter, with the slit means still interposed, and a latent smear image of the object may be formed on a different portion of the film by high-speed camera operation, the first three images serving as reference data for study of said smear image.

3. The method of photographically recording explosive phenomena with a high-speed camera of the type which has means for holding a strip of film in a fixed position and utilizes a rotating mirror in the optical system thereof, comprising the steps of holding said mirror in a given position in which the illuminated image of an explosive object before explosion may be reflected to a portion of said strip of film, forming a latent image of the object on said strip of film with the mirror thus held, releasing said mirror and then operating said camera as a high-speed camera to form on a different portion of said film a latent smear image of the same object in the same position while it is exploding, whereby the first mentioned image may serve as a reference background for comparison with the second mentioned image.

4. The method of photographically recording explosive phenomena with a high-speed camera of the type which has means for holding a strip of film in a fixed position and utilizes a rotating mirror in the optical system thereof, comprising the steps of holding said mirror in a given position in which the illuminated image of an explosive object before explosion may be reflected to said strip of film, forming a latent image of the object on said strip of film with the mirror thus held, interposing a slit shutter between said object and the mirror with the mirror still held in the same position, forming a slit image of the then visible portion of the object superimposed over said first mentioned image on said strip of film, releasing said mirror, and then operating said camera as a high-speed camera with the slit shutter still interposed to form on a different portion of said film a latent smear image of the same object in the same position while it is exploding, whereby the first mentioned image may serve as a horizontal reference and the second mentioned image may serve as a vertical reference and to identify the area of the object of which the smear image is made, so that comparison of said smear image may be made against said reference images.

5. The method of photographically recording explosive phenomena with a high-speed camera of the type which has means for holding a strip of film in a fixed position and utilizes a rotating mirror in the optical system thereof, comprising the steps of holding said mirror in a given indexed position in which the illuminated image of an explosive object before explosion may be reflected to a portion of said strip of film, forming a latent image of the object on said strip of film with the mirror thus held, interposing a slit shutter between said object and the mirror with the mirror still held in the same position and forming a latent slit image of the then visible portion of the object superimposed over said first mentioned image on said strip of film, shifting said mirror to a second indexed position and forming a second latent slit image of the object with the mirror held in said second position and the slit still interposed between the mirror and the object, so that the said second slit image is formed at a different portion of said film, a distance from the previously formed latent images, releasing said mirror and then operating said camera as a high-speed camera with the slit still interposed to form on a different portion of said film a latent smear image of the same object in the same position while said object is exploding, whereby the previously formed images may serve as reference data for study of said smear image.

6. A high-speed camera comprising a casing, said casing having a light admittance opening, a film holder on said casing, a lens system aligned with said opening, a mirror mounted for rotation within said casing at the optical axis of said lens system and operable to reflect the light image of an object to said film holder, a slit plate and a shutter plate mounted adjacent said light admittance opening and each individually selectively disposable across said opening, and means for releasably holding said mirror in preselected angular positions in which it is adapted to reflect the light image of said object or portions thereof to said film holder.

7. A high-speed camera comprising a casing, said casing having a light admittance opening, a film holder on said casing, a lens system aligned with said opening, a mirror mounted for rotation within said casing at the optical axis of said lens system and operable to reflect the light image of an object to said film holder, means for driving said mirror in rotation whereby said reflected light image may be caused to sweep across a strip of film held in said film holder, spring retracted detent means on said casing for releasably engaging and holding said mirror in predetermined angular positions whereby an illuminated still image may be reflected so as to impinge upon preselected portions of said film, a shutter plate mounted adjacent said opening and having a shutter window formed therein, said shutter plate being movable transversely of the optical axis of the camera for causing said shutter window to move across said opening, means for actuating said shutter plate, and an opaque slit plate having a slit formed therein, said slit plate being mounted adjacent said shutter plate and movable from a retracted position to an extended position wherein said plate is disposed across the camera casing light admittance opening with said slit on the optical axis of the camera.

8. The arrangement according to claim 7 wherein said shutter actuating means comprises a solenoid.

9. A high-speed camera comprising a casing, said casing having a light admittance opening, a film holder on said casing, a lens system aligned with said opening, a mirror mounted for rotation within said casing at the optical axis of said lens system and operable to reflect the light image of an object to said film holder, means for driving said mirror in rotation whereby said reflected light image may be caused to sweep across a strip of film held in said film holder, spring retracted detent means on said casing for releasably engaging and holding said mirror in predetermined angular positions whereby an illuminated still image may be reflected so as to impinge upon preselected portions of said film, a shutter plate mounted adjacent said opening and having a shutter window formed therein, said shutter plate being movable transversely of the optical axis of the camera for causing said shutter window to move across said opening, and means for actuating said shutter plate.

10. The arrangement according to claim 9 wherein said shutter actuating means comprises a solenoid.

References Cited in the file of this patent

UNITED STATES PATENTS

| | | |
|---|---|---|
| 592,934 | Minott | Nov. 2, 1897 |
| 1,533,433 | Linden | Apr. 14, 1925 |
| 1,950,374 | Kanolt | Mar. 6, 1934 |

FOREIGN PATENTS

| | | |
|---|---|---|
| 582,637 | Great Britain | Nov. 22, 1946 |